United States Patent [19]

Park

[11] Patent Number: 5,917,301
[45] Date of Patent: Jun. 29, 1999

[54] METHOD FOR GENERATING A MOTION PROFILE OF A MOTOR

[75] Inventor: In-oh Park, Seoul, Rep. of Korea

[73] Assignee: Samsung Aerospace Industries, Ltd., Kyongsangnam-do, Rep. of Korea

[21] Appl. No.: 09/031,757

[22] Filed: Feb. 27, 1998

[51] Int. Cl.$^6$ ........................................ G05B 11/36
[52] U.S. Cl. ................ 318/609; 318/636; 318/561; 318/571; 318/616; 318/573; 318/618; 364/178
[58] Field of Search .................... 318/636, 561, 318/571, 616, 573, 618, 609; 364/178

[56] References Cited

U.S. PATENT DOCUMENTS 4,554,497  11/1985  Nozawa et al. .
4,555,758  11/1985  Inaba et al. .

*Primary Examiner*—Karen Masih
*Attorney, Agent, or Firm*—Finnegan, Henderson, Farabow, Garrett & Dunner, L.L.P.

[57] ABSTRACT

Methods and systems consistent with the invention generate a motion profile of a motor. A reference acceleration profile, a reference velocity profile, and a reference displacement profile are first defined. Displacement-velocity data defining displacement data with respect to velocity data is then stored in a memory. A plurality of conversion constants which include a maximum velocity ratio K1, a maximum acceleration ratio K2, and a displacement conversion constant K3, are calculated, are then calculated using following equations:

$$K_1 = \frac{v_{max}}{V_{max}}, K_2 = \frac{a_{max}}{A_{max}} \text{ and } K_3 = \frac{K_2}{K^2_1}$$

where $A_{max}$ represents a maximum acceleration value in the reference acceleration profile, $V_{max}$ represents a maximum velocity value in the reference velocity profile, $a_{max}$ represents a maximum acceleration value in the generated profile, and $V_{max}$ represents a maximum velocity data in the profile to be generated. The system then determines a position data of the motor and maps the position data into a reference displacement data. A reference velocity data corresponding to the reference displacement data is then read from the memory. Finally, a driving velocity data is calculated from the reference velocity data.

8 Claims, 5 Drawing Sheets

METHOD FOR GENERATING A MOTION PROFILE OF A MOTOR

BACKGROUND OF THE INVENTION

1. Field of the Invention

The present invention relates to motor control systems and methods and, more particularly, to motor control systems and methods for generating a motion profile of a motor.

2. Description of Related Art

Motor control is a requirement for most industrial motorized systems, such as robotic systems or semiconductor manufacturing systems. For most motor control systems it is important to correctly generate the profile of a motor. The profile of a motor refers to the time dependent relationships of the rotational velocity and rotational angle of the motor.

FIG. 1 is a block diagram of a conventional motor control circuit. As shown in FIG. 1, the conventional motor controlling circuit includes a motor 11, a profile generator 12, a subtractor 13, a feed-back controller 14, an adder 15, and a feed-forward controller 16. Profile generator 12 receives positional data from motor 11 and outputs acceleration data (a), velocity data (v), and displacement data (s) of motor 11. Subtractor 13 subtracts the positional data of motor 11 from the displacement data (s) output by profile generator 12. Feed back controller 14 receives the output of subtractor 13 and generates a feed back control signal. Feed forward controller 16 receives the acceleration data (a) and the velocity data (v) output by profile generator 12 and generates a feed forward control signal. Adder 15 adds the positional data of motor 11, the feed back and feed forward control signals, and outputs a control signal to motor 11.

In the above-described motor control circuit, motor 11 has a constant rate of acceleration or deceleration and operates at constant rates of speed. Profile generator 12 determines the acceleration, deceleration and velocity of motor 11 based on profile data for the acceleration data (a), velocity data (v) and displacement data (s).

Conventional profile generating methods for use in profile generator 12 can be divided into two general types. First, a software-based method may be used to determine the velocity profile using a polynomial profile generating function that models velocity with respect to time. The profile generating function is stored in a memory and can be used to determine a velocity data at a given point in time. Preferably, the polynomial function has a high order so that the velocity profile can be accurately modeled. However, the calculation time increases almost exponentially with the order of the polynomial. Thus, this method is time intensive making it impractical for many industrial applications.

The second profile generating method is a hardware-based method that generates the velocity profile through a digital circuit. Examples of this type of method are disclosed in U.S. Pat. No. 4,554,497, entitled Acceleration/Deceleration Circuit, and U.S. Pat. No. 4,554,758, entitled Method and Apparatus for Controlling the Acceleration and Deceleration of a Movable Element Without Abrupt Changes in Motion. Under the hardware-based method, however, the velocity profile is fixed by the hardware. Another drawback is that it is difficult to make the profile for an acceleration interval different from that for a deceleration interval.

SUMMARY OF THE INVENTION

Systems consistent with the present invention provide a high-speed profile generating method for calculating an accurate profile function. The system stores characteristics of a reference profile and compares a generated profile with the reference profile.

To achieve these and other advantages, a method for generating velocity data of a motor includes the step of determining a reference acceleration profile defining acceleration data with respect to time, a reference velocity profile defining velocity data with respect to time, and a reference displacement profile defining displacement data with respect to time. The method then stores displacement-velocity data, defining the displacement data with respect to the velocity data, in a memory. The position data of the motor and a reference displacement data corresponding to the position data using the reference displacement profile are then determined. The method further determines a reference velocity data, corresponding to the determined reference data, from the displacement-velocity data stored in the memory. Finally, the method calculates a driving velocity data from the reference velocity data.

According to another aspect of the invention, a method for generating acceleration data of a motor includes the step of determining a reference acceleration profile defining acceleration data with respect to time, a reference velocity profile defining velocity data with respect to time, and a reference displacement profile defining displacement data with respect to time. The method then stores displacement-acceleration data, defining the displacement data with respect to the acceleration data, in a memory. The position data of the motor and a reference displacement data corresponding to the position data using the reference displacement profile are then determined. The method further determines a reference acceleration data, corresponding to the determined reference data, from the displacement-acceleration data stored in the memory. Finally, the method calculates a driving acceleration data from the reference acceleration data.

Both the foregoing general description and the following Detailed Description are exemplary and are intended to provide further explanation of the invention as claimed.

BRIEF DESCRIPTION OF THE DRAWINGS

The accompanying drawings provide a further understanding of the invention and, together with the Detailed Description, explain the principles of the invention. In the drawings.

DETAILED DESCRIPTION OF THE INVENTION

Figure 1:
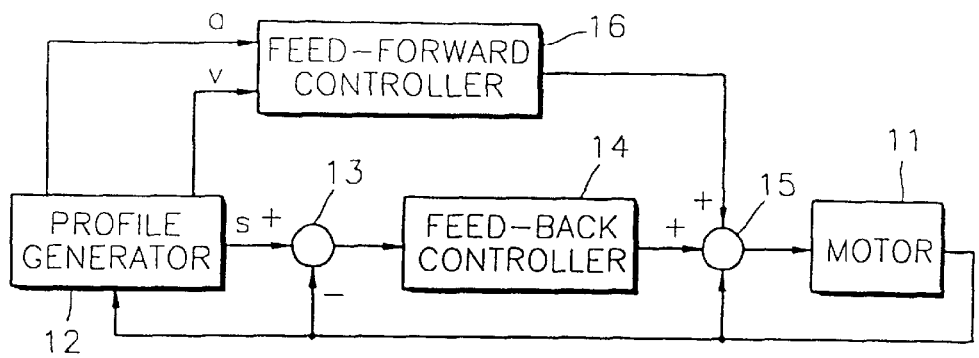
FIG. 1 is a block diagram of a conventional motor control circuit.

Profile generating systems and methods consistent with the present invention may be used, for example, as profile generator 12 of FIG. 1. Generally, a profile for controlling a motor includes an acceleration function a(t), a velocity function v(t), and displacement function s(t), each described with respect to time. For any given application, the shapes of the profiles preferably do not change for each motor, but will differ only by their maximum values and time scales.

In systems consistent with the present invention, the profile generator stores a reference profile in a memory and uses the reference profile to generate a generated profile for the particular application. The stored reference profile includes a profile of the relationship of a velocity data (v) with respect to a displacement data (s) or the relationship of an acceleration data (a) with respect to the displacement (s). This reference profile data is not dependent upon time so that it can be used to generate a generated profile having a different time scale than that of the reference profile.

Figure 2A:
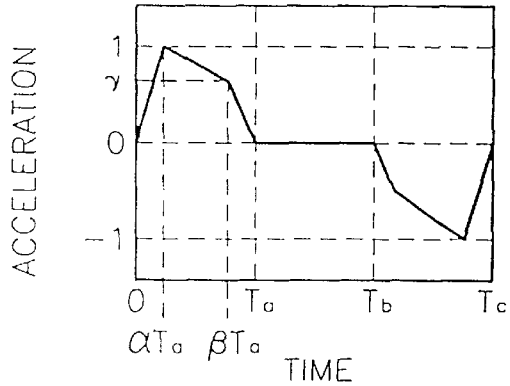
FIGS. 2A to 2D are diagrams illustrating a first example of a reference profile.
Figure 2B:
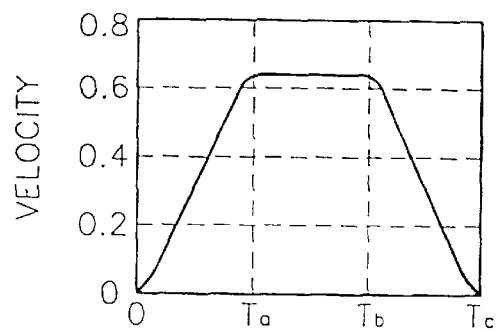
Figure 2C:
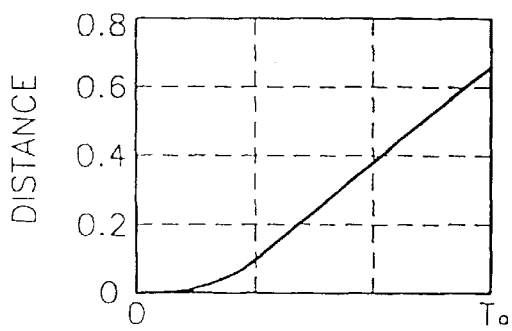
Figure 2D:
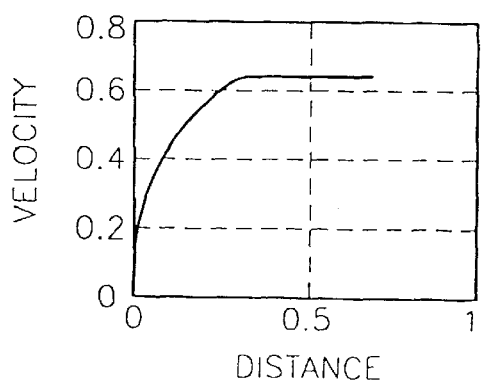

FIGS. 2A to 2D are diagrams illustrating a first example of a reference profile. Specifically, FIG. 2A shows an acceleration profile with respect to time, FIG. 2B shows a velocity profile with respect to time, FIG. 2C shows a displacement profile with respect to time, and FIG. 2D shows the relationship between the velocity and the displacement.

The profiles of FIG. 2 include an acceleration interval (0, Ta), a constant-speed operation interval (Ta, Tb), and a deceleration interval (Tb, Tc). FIG. 2A shows that the acceleration reference profile models the critical points in the acceleration interval (0, Ta) by percentage coefficients in the both the time scale and the magnitude scale. Specifically, the critical points are indicated in the time scale by αTa and βTa, and indicated in the magnitude scale by a ratio γ with respect to a maximum acceleration.

In the acceleration or deceleration interval, the acceleration A(t), the displacement S(t) and the velocity V(t) of the reference profile satisfies the following equation:

$$K \cdot A(t)S(t) = V(t)^2$$

where K is a constant varying with the shapes of profiles for a given application. For example, K is 2 when the motor accelerates at a constant rate.

Two profiles which have the same shapes have the same constant $$K = \frac{V(t)^2}{A(t)S(t)}.$$

Since the reference profile and the generated profile generally have the same shape for a given application, the reference profile and the generated profile each satisfy the following equation:

$$\frac{V(t)^2}{A(t)S(t)} = \frac{v(t)^2}{a(t)s(t)} \tag{1}$$

where, a(t), v(t), s(t) denotes the acceleration, distance and velocity of the generated profile, respectively.

Equation 1 can be rearranged into the following Equation 2:

$$S(t) = \frac{a(t)}{A(t)} \frac{V(t)^2}{v(t)^2} s(t) = \frac{a_{max}}{A_{max}} \frac{V^2_{max}}{v^2_{max}} s(t) \tag{2}$$

where $A_{max}$ and $V_{max}$ represent a maximum acceleration and a maximum velocity, respectively, of the reference profile, and $a_{max}$ and $v_{max}$ represent a maximum acceleration and a maximum velocity of the generated profile, respectively. Accordingly, the displacement of the generated profile can be mapped into the displacement of the reference profile.

Further, the velocity data of the generated profile and the velocity data of the reference profile satisfy the following equation:

$$\frac{V(t)}{V_{max}} = \frac{v(t)}{v_{max}} \tag{3}$$

Thus, the velocity in the reference profile can mapped into the velocity of the generated profile by using the following equation:

$$v(t) = \frac{v_{max}}{V_{max}} V(t) \tag{4}$$

In order to simplify Equations 2 and 4, a maximum velocity ratio $K_1$ and a maximum acceleration ratio $K_2$ are defined, respectively, as follows:

$$K_1 = \frac{v_{max}}{V_{max}} \tag{5}$$

$$K_2 = \frac{a_{max}}{A_{max}} \tag{6}$$

Further, a third constant $K_3$ is defined as follows:

$$K_3 = \frac{K_2}{K_1^2} \tag{7}$$

Equations 2 and 4 can then be simplified into the following equations:

$$S(t) = K_3 \cdot s(t) \tag{8}$$
$$v(t) = K_1 \cdot V(t) \tag{9}$$

As well known to those skilled in the art, the position of the motor shaft may be obtained using a sensor. Equation 8, therefore, maps the position of the motor at a particular point in time into a corresponding displacement point in the reference profile. FIG. 2D can then be used to determine a velocity value in the reference profile that corresponds to the displacement point. Equation 9 is then used to determine a generated velocity data.

Figure 3:
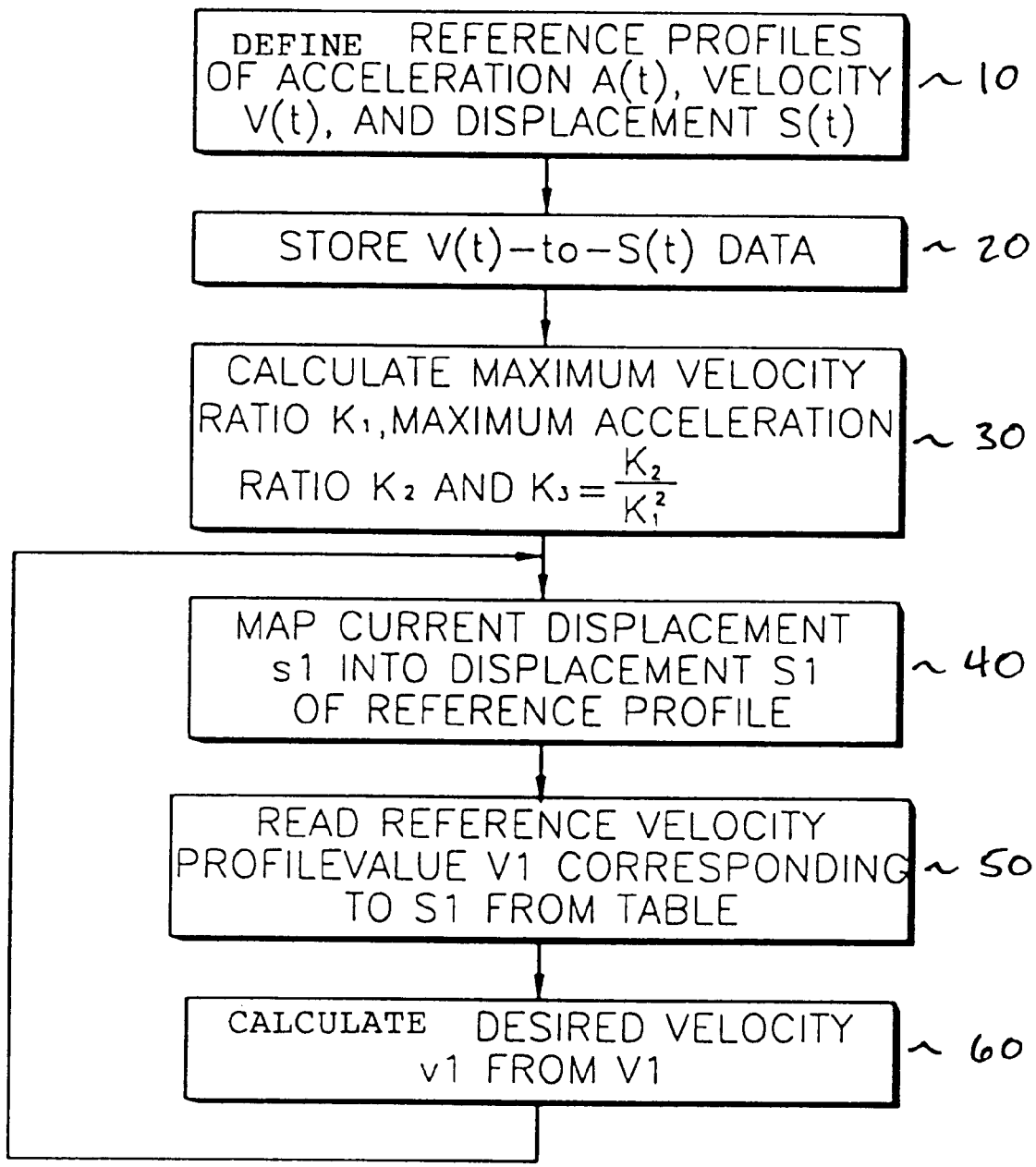
FIG. 3 is a flowchart of a profile generating method consistent with the present invention.

FIG. 3 is a flowchart of a profile generating method, consistent with the present invention, based on the basis of the above-described principles. First, the profile generator defines a reference acceleration profile and a reference velocity profile based upon a maximum acceleration value and a maximum velocity value (step 10). The relationship of the distance data S(t) with respect to the velocity data V(t), independent of the time parameter t, is then determined and stored in a look-up-table (step 20). The elimination of the dependence on time parameter t may be carried out mathematically. Alternatively, the elimination of the dependence on the time parameter t can be performed by sampling a plurality of data (s, v) in the curves of the S(t) and V(t) profiles. FIG. 2D shows an example of the relationship between velocity and distance independent of the time parameter t.

In the present embodiment, the velocity-to-distance data is sampled at FIG. 2D. To reduce the amount of stored data, data may also be sampled at logarithmic intervals from the relationship of FIG. 2D. Furthermore, the data may be stored in a physical memory or by software.

The profile generator then calculates the maximum velocity ratio K1, the maximum acceleration ratio K2 and the constant K3 using Equations 5 through 7 (step 30). When the generated profile is then used during a motor control operation, the profile generator calculates Equation 8 to map the sensed current position s1 of the motor into a displacement data S1 of the reference profile (step 40). Next, the profile generator reads the velocity data V1 corresponding to the displacement data S1 from the look-up-table (step 50). The profile generator then calculates a driving velocity v1 from the velocity V1 of the reference profile using Equation 9 (step 60). Furthermore, the generated profile over an acceleration interval can be determined by repeating steps 40 to 60.

The generated profile over the deceleration interval is determined using the fact that the profiles of the acceleration section and deceleration section are symmetrical to each other in most of applications, and by substituting a remaining distance into a displacement data. Alternatively, the profile of the deceleration interval can be made different from that of the acceleration interval. In such a case, respective profiles of the deceleration and acceleration intervals is stored in the look-up-table.

As described above, velocity data may be obtained from the positional data of the motor. However, the profile generator may also calculate acceleration data from the positional data of the motor using the method described above with respect to FIG. 3. In this case, the look-up-table stores sampled data describing the relationship between the acceleration data (a) with respect to the distance data (s).

Figure 4A:
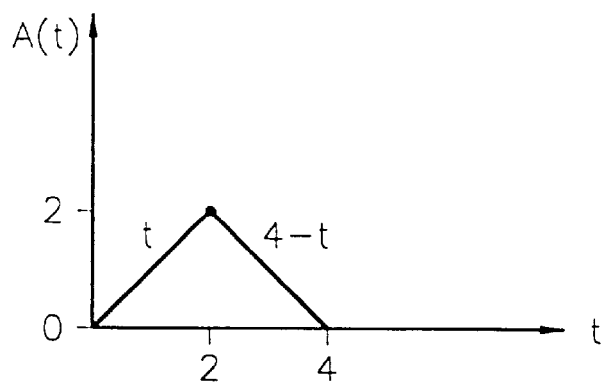
FIGS. 4A to 4D are diagrams illustrating a second example of a reference profile.
Figure 4B:
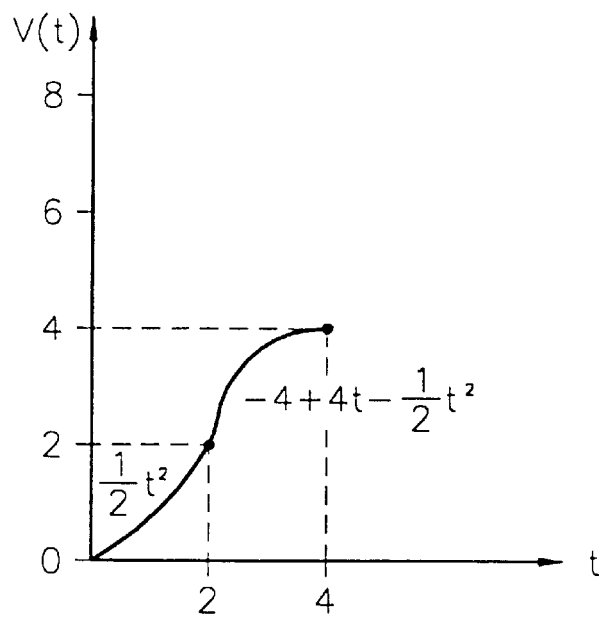
Figure 4C:
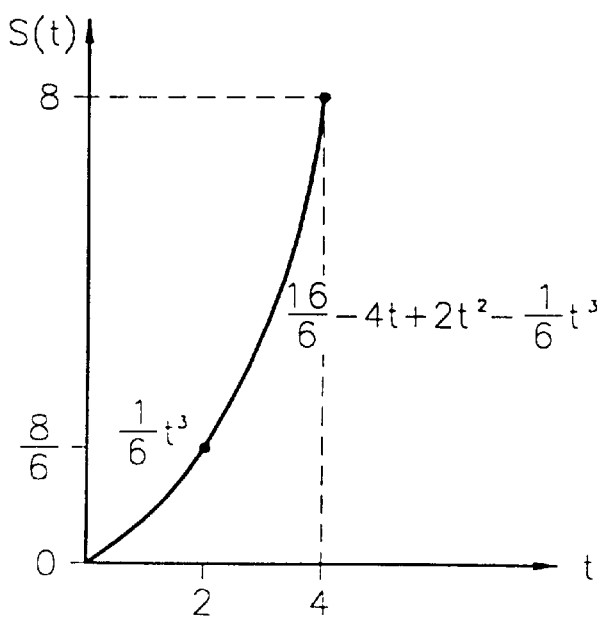
Figure 4D:
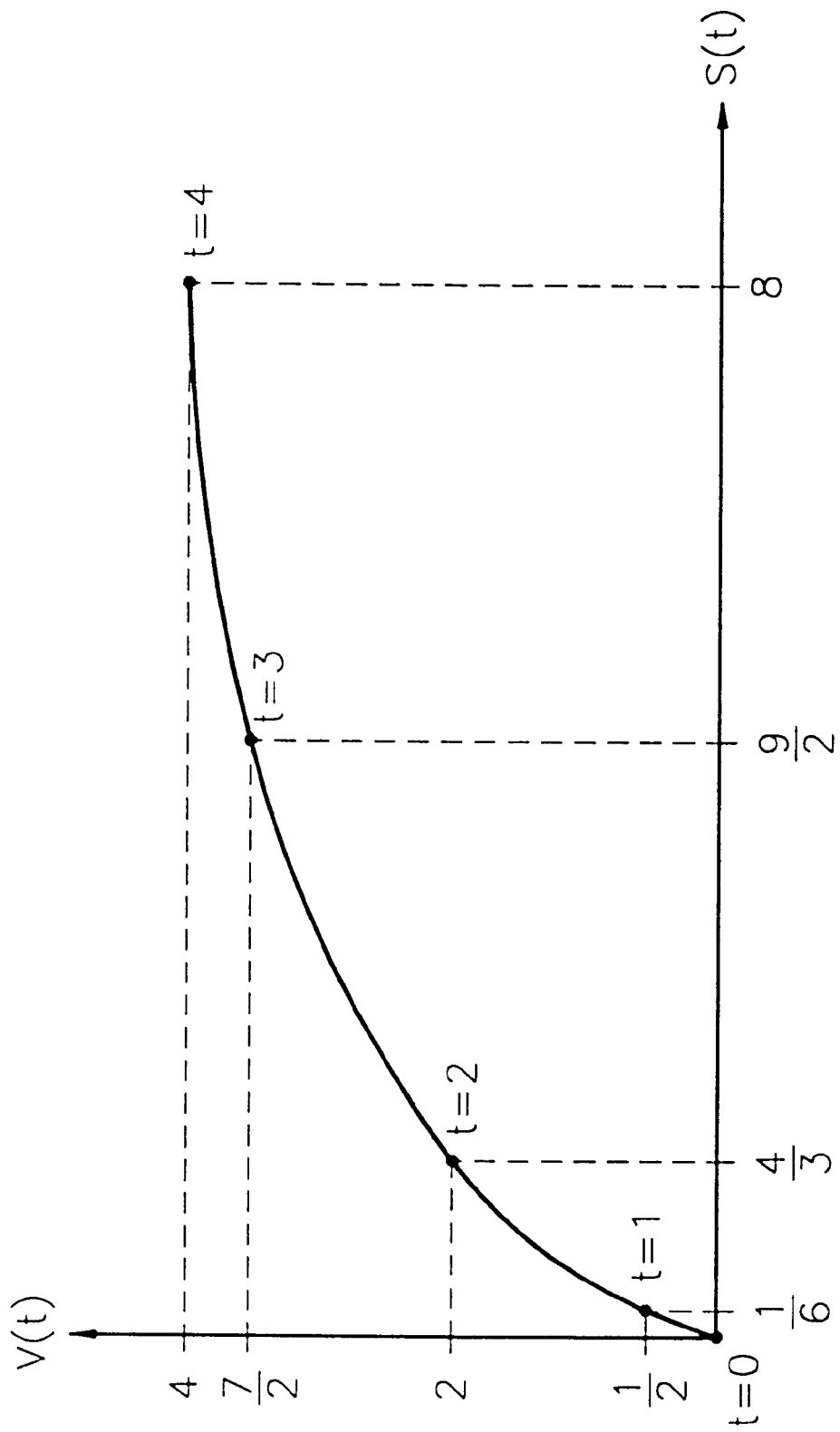

FIGS. 4A to 4D are diagrams illustrating a second example of a reference profile. Specifically, FIG. 4A shows an acceleration profile with respect to time, FIG. 4B shows a velocity profile with respect to time, FIG. 4C shows a displacement profile with respect to time, and FIG. 4D shows the relationship between the velocity and the displacement.

Figure 5A:
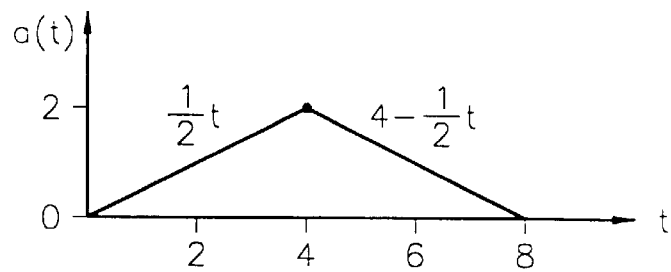
FIGS. 5A to 5C are diagrams illustrating a generated profile generated using the profile generating method of FIG. 3 and the reference profile shown in FIG. 4D.
Figure 5B:
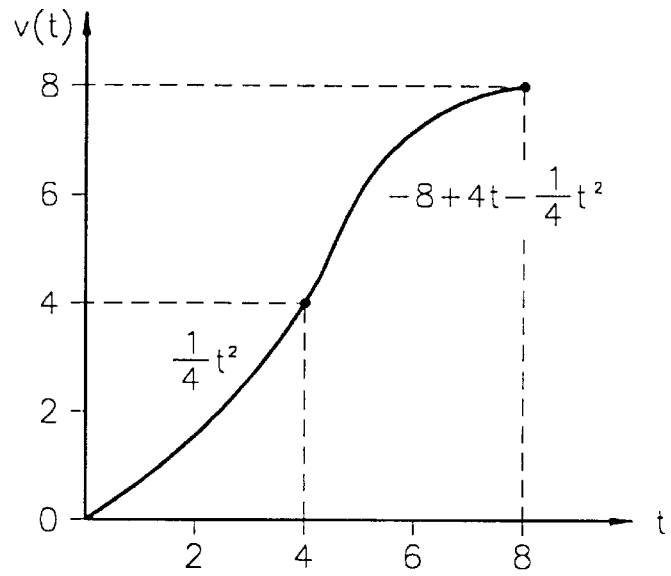
Figure 5C:
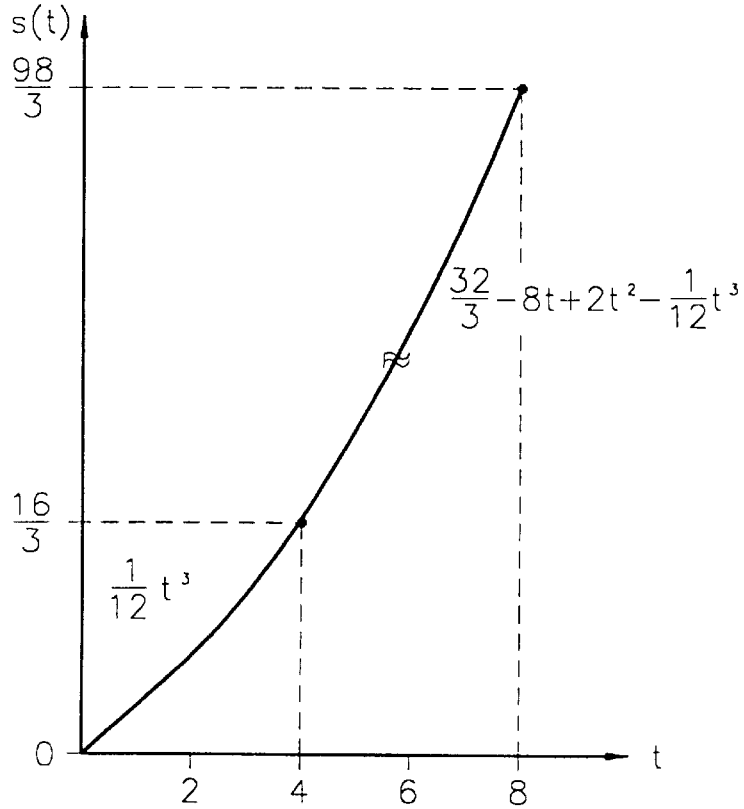

FIGS. 5A to 5C are diagrams illustrating a generated profile generated using the profile generating method of FIG. 3 and the reference profile shown in FIG. 4D. FIG. 5A shows an acceleration profile with respect to time, FIG. 5B shows a velocity profile with respect to time, and FIG. 5C shows a displacement profile with respect to time.

Described below are the calculations performed by the profile generator, using the profile generating method of FIG. 3 and the reference profile shown in FIG. 4D, to determine the velocity at t=2. As described above, the profile generator first detects the position (e.g. at t=2) by a sensor. As shown in FIG. 5C, the detected position value has the following value:

$$s(t=2) = \left[\frac{1}{12}t^3\right]_{t=2} = \frac{2}{3}$$

Representing the position s(t=2) by s1 for simplicity, profile generator uses Equation 8 to map the position s1 into a corresponding displacement S1 in the reference profile, as shown below.

$$S1 = \frac{a_{max}}{A_{max}} \frac{V^2_{max}}{v^2_{max}} s1 = \frac{2}{2} \frac{4^2}{8^2} \frac{2}{3} = \frac{1}{6}$$

Profile generator then reads a velocity data V1 in the reference profile corresponding to the displacement S1 from the look-up-table. Referring to FIG. 4D, V1 has a value of ½ for a corresponding value of S1=⅙. Finally, a velocity v1 at t=2 is obtained by Equation 9:

$$v1 = v(t=2) = \frac{v_{max}}{V_{max}} V1 = \frac{8}{4}\frac{1}{2} = 1$$

The above obtained driving velocity data v1 has the same value as that calculated directly from the velocity profile of FIG. 5B as follows:

$$v(t=2) = \left[\frac{1}{4}t^2\right]_{t=2} = 1$$

Even though the operation of the present invention was shown by the example of t=2, the driving velocity at any other time, e.g. at t=6, can be obtained in the same manner as that described above.

The profile generating method according to the present invention requires the initial calculations of Equations 5 through 7 for determining the constants K1, K2 and K3, and two calculations of Equations 8 and 9 at every sampling. Since Equations 5 through 7 must be calculated only once, only two multiplications are needed to calculate each driving velocity data value. Thus, profile generators consistent with the present invention have a low calculation time, allowing for fast operation of the motor control.

Systems consistent with the present invention also allow more reference profile data to be stored to create more accurate velocity or acceleration generated profiles. Furthermore, the maximum acceleration or deceleration values over the acceleration and deceleration intervals can be made different from each other. In such a case, the profile generator can generate a velocity profile having characteristics of an acceleration curve different from that of a deceleration curve.

It will be apparent to those skilled in the art that various modifications and variations can be made to the system and method of the present invention without departing from the spirit or scope of the invention. The present invention covers the modifications and variations of this invention provided they come within the scope of the appended claims and their equivalents.

What is claimed is:

1. A method for generating velocity data of a motor, comprising the steps of:

(a) determining a reference acceleration profile defining acceleration data with respect to time, a reference velocity profile defining velocity data with respect to time, and a reference displacement profile defining displacement data with respect to time;

(b) storing displacement-velocity data in a memory, the displacement-velocity data defining the displacement data with respect to the velocity data;

(c) determining a position data of the motor;

(d) determining a reference displacement data corresponding to the position data using the reference displacement profile;

(e) determining a reference velocity data, corresponding to the determined reference data, from the displacement-velocity data stored in the memory; and (f) calculating a driving velocity data from the reference velocity data.

2. The method of claim 1, further comprising the step of:

calculating, after step (b), a maximum velocity ratio K1, a maximum acceleration ratio K2, and a displacement conversion constant K3, according to the following equations:

$$K_1 = \frac{v_{\max}}{V_{\max}}, \ K_2 = \frac{a_{\max}}{A_{\max}} \text{ and } K_3 = \frac{K_2}{K^2_1}$$

where $A_{max}$ represents a maximum acceleration value in the reference acceleration profile, $V_{max}$ represents a maximum velocity value in the reference velocity profile, $a_{max}$ represents a maximum acceleration value in the generated profile, and $v_{max}$ represents a maximum velocity data in the profile to be generated.

3. The method of claim 2, wherein step (d) further includes the step of:

determining the reference displacement data corresponding to the position data using the reference displacement profile according to the following equation:

$$S1 = K_3 \cdot s1$$

where S1 represents the reference displacement data and s1 represents the position data.

4. The method of claim 2, wherein step (f) further includes the step of:

calculating the driving velocity data from the reference velocity data according to the following equation:

$$v1 = K_1 \cdot V1$$

where v1 represents the driving velocity data and V1 represents the reference velocity data.

5. A method for generating acceleration data of a motor, comprising the steps of:

(a) determining a reference acceleration profile defining acceleration data with respect to time, a reference velocity profile defining velocity data with respect to time, and a reference displacement profile defining displacement data with respect to time;

(b) storing displacement-acceleration data in a memory, the displacement-acceleration data defining the displacement data with respect to the acceleration data;

(c) determining a position data of the motor;

(d) determining a reference displacement data corresponding to the position data using the reference displacement profile;

(e) determining a reference acceleration data, corresponding to the determined reference displacement data, from the displacement-acceleration data stored in the memory; and (f) calculating a driving acceleration data from the reference acceleration data.

6. The method of claim 5, further comprising the step of:

calculating, after step (b), a maximum velocity ratio K1, a maximum acceleration ratio K2, and a displacement conversion constant K3, according to the following equations:

$$K_1 = \frac{v_{\max}}{V_{\max}}, \ K_2 = \frac{a_{\max}}{A_{\max}} \text{ and } K_3 = \frac{K_2}{K^2_1}$$

where $A_{max}$ represents a maximum acceleration value in the reference acceleration profile, $V_{max}$ represents a maximum velocity value in the reference velocity profile, $a_{max}$ represents a maximum acceleration value in the generated profile, and $v_{max}$ represents a maximum velocity data in the profile to be generated.

7. The method of claim 6, wherein step (d) further includes the step of:

determining the reference displacement data corresponding to the position data using the reference displacement profile according to the following equation:

$$S1 = K_3 \cdot s1$$

where S1 represents the reference displacement data and s1 represents the position data.

8. The method of claim 6, wherein step (f) further includes the step of:

calculating a driving acceleration data from the reference acceleration data according to the following equation:

$$a1 = K_1 \cdot A1$$

where a1 represents the driving acceleration data and A1 represents the reference acceleration data.

* * * * *